United States Patent [19]
Toto

[11] 3,881,707
[45] May 6, 1975

[54] SCOOP MEANS AND ARRANGEMENTS THEREOF FOR VEHICULAR COMPOSTING MACHINE

[76] Inventor: Louis R. Toto, Box 78, Penn Green Rd., Landenberg, Pa. 19350

[22] Filed: Dec. 3, 1973

[21] Appl. No.: 420,865

Related U.S. Application Data

[63] Continuation-in-part of Ser. No. 241,129, April 5, 1972, Pat. No. 3,776,528.

[52] U.S. Cl.............................. 259/183; 23/259.1
[51] Int. Cl............................................... B01f 7/04
[58] Field of Search......... 259/182, 183, 184, 9, 10, 259/2, 25, 26, 45, 46; 23/259.1, 259.3

[56] References Cited
UNITED STATES PATENTS

| | | | |
|---|---|---|---|
| 1,827,358 | 10/1931 | Giletti | 259/184 |
| 3,323,896 | 6/1967 | Brown | 23/259.1 |
| 3,369,797 | 2/1968 | Cobey | 259/183 |

*Primary Examiner*—Robert W. Jenkins
*Attorney, Agent, or Firm*—DePaoli & O'Brien

[57] ABSTRACT

For use in a vehicular composting machine, an improved scoop means, having a pressure means and a dewatering means, is provided for selectively densifying and dewatering the clumps which are liftingly detached from an upstanding endwise wall of a compacted rick, whereby compaction of the detached clumps during impact and curvilinear acceleration thereafter can be controlled. The pressure means comprises paddle-type scoops having a selected angle between the blades thereof to obtain sidewise compressive force of a selected magnitude, and the dewatering means comprises perforations in the scoops. A differential chopping means, comprising relatively narrowed scoops disposed at the extremities of a beater drum, is also provided for creating more intensive chopping of material in the side portions of a rick as compared to the middle portions thereof. A capacity means, comprising a staggered arrangement of closely spaced rows of scoops, is additionally provided for increasing the capacity of the vehicular composting machine without compacting the detached clumps into balls.

13 Claims, 24 Drawing Figures

3,881,707

PATENTED MAY 6 1975

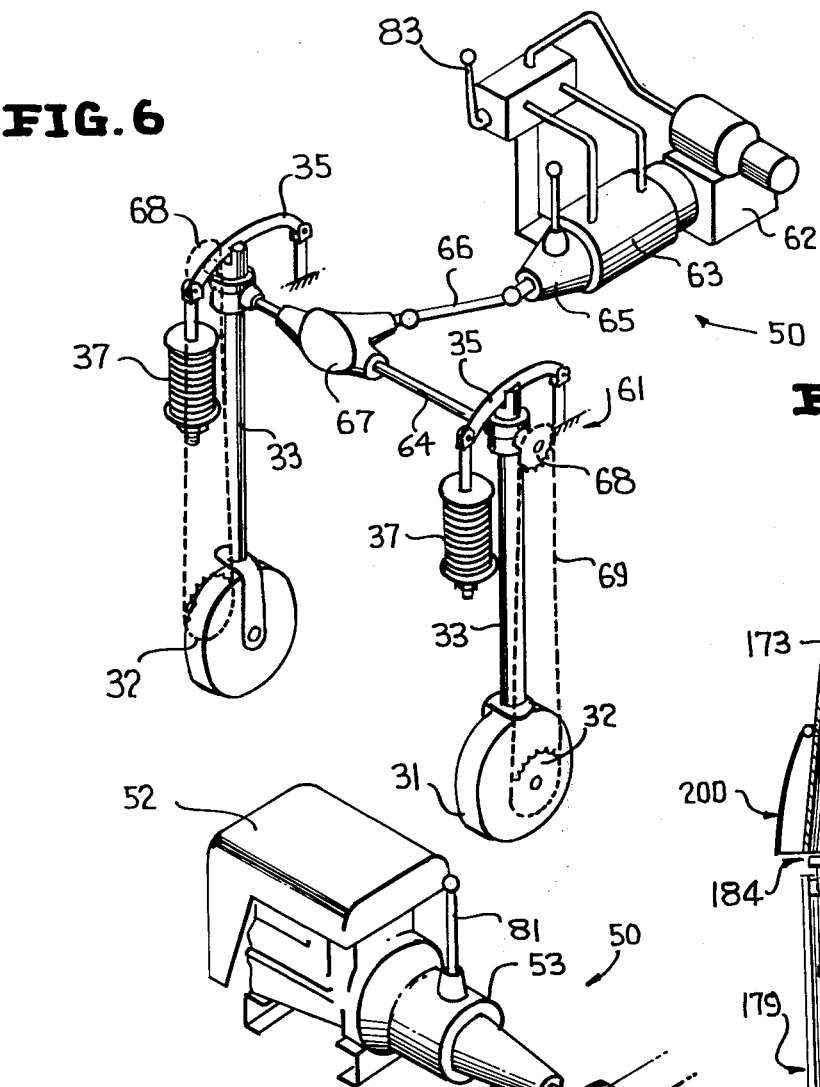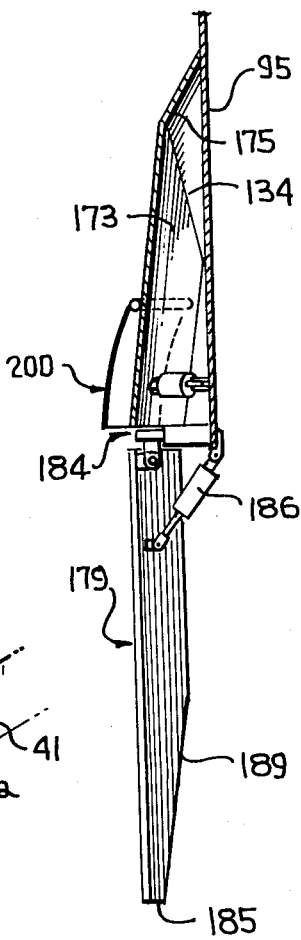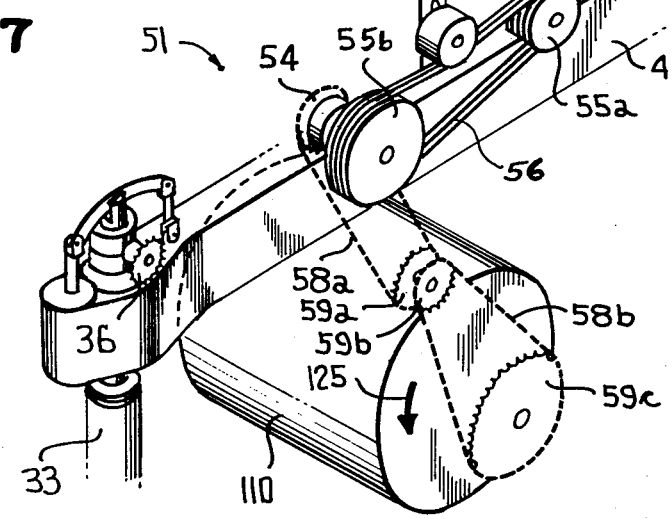

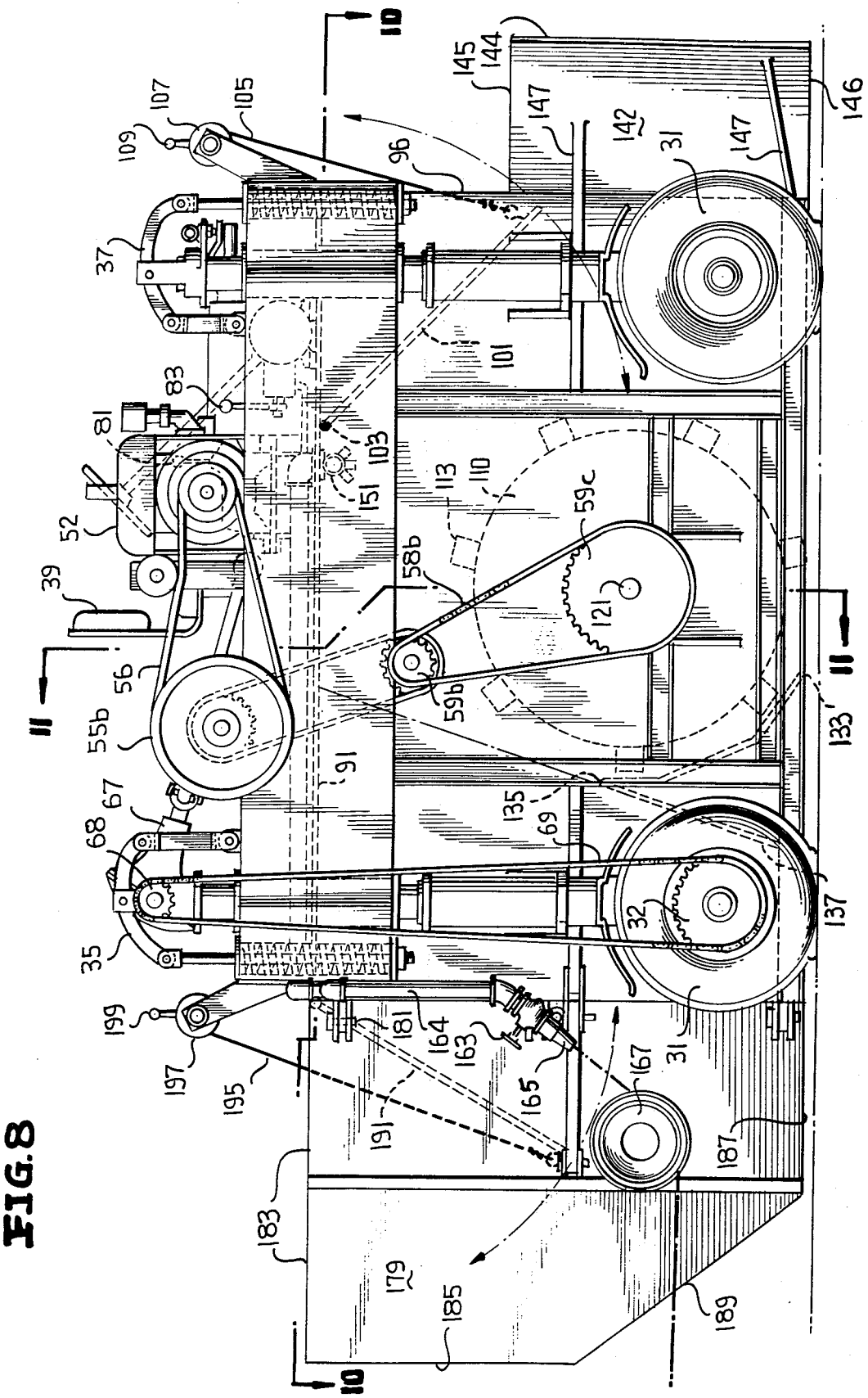

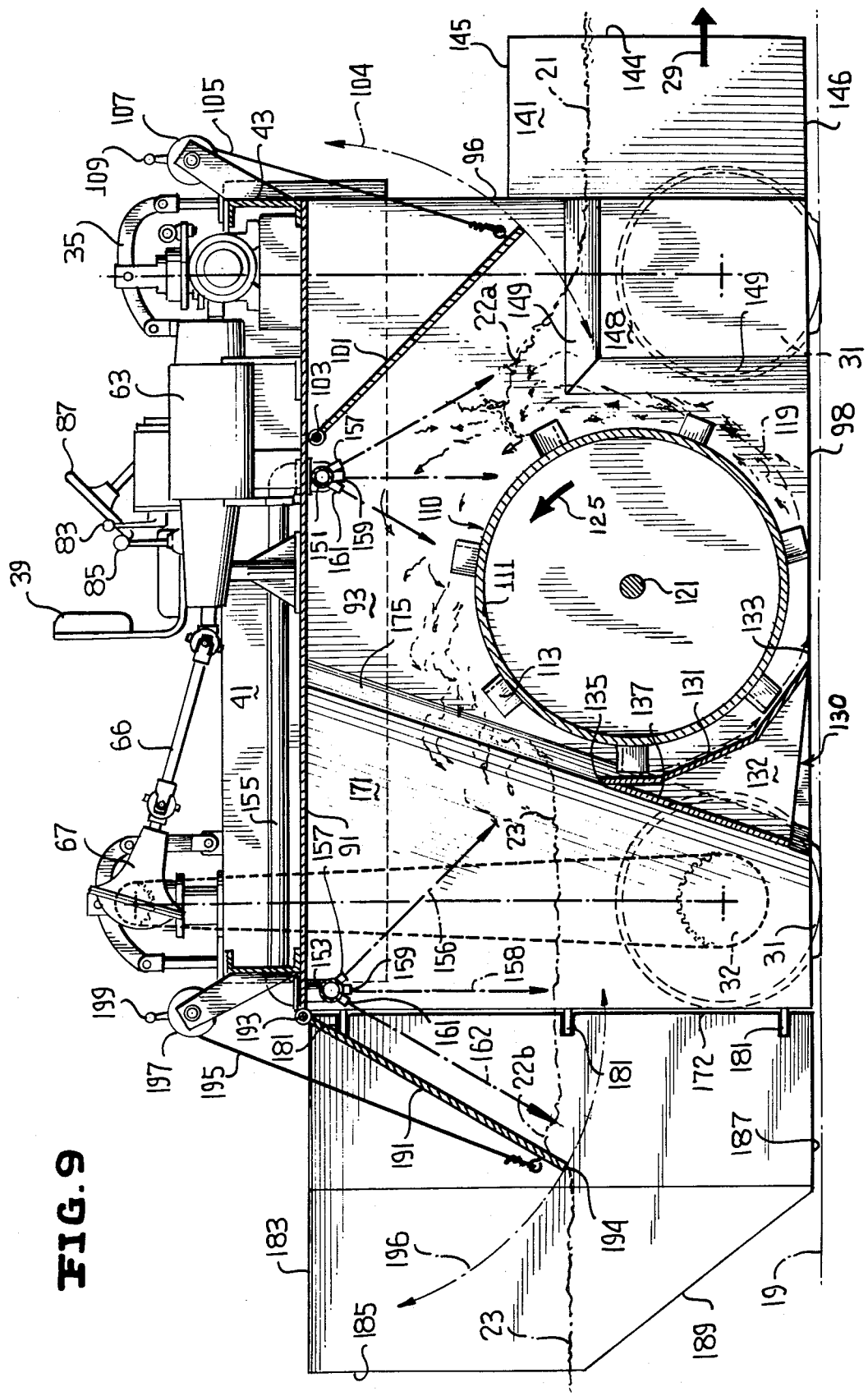

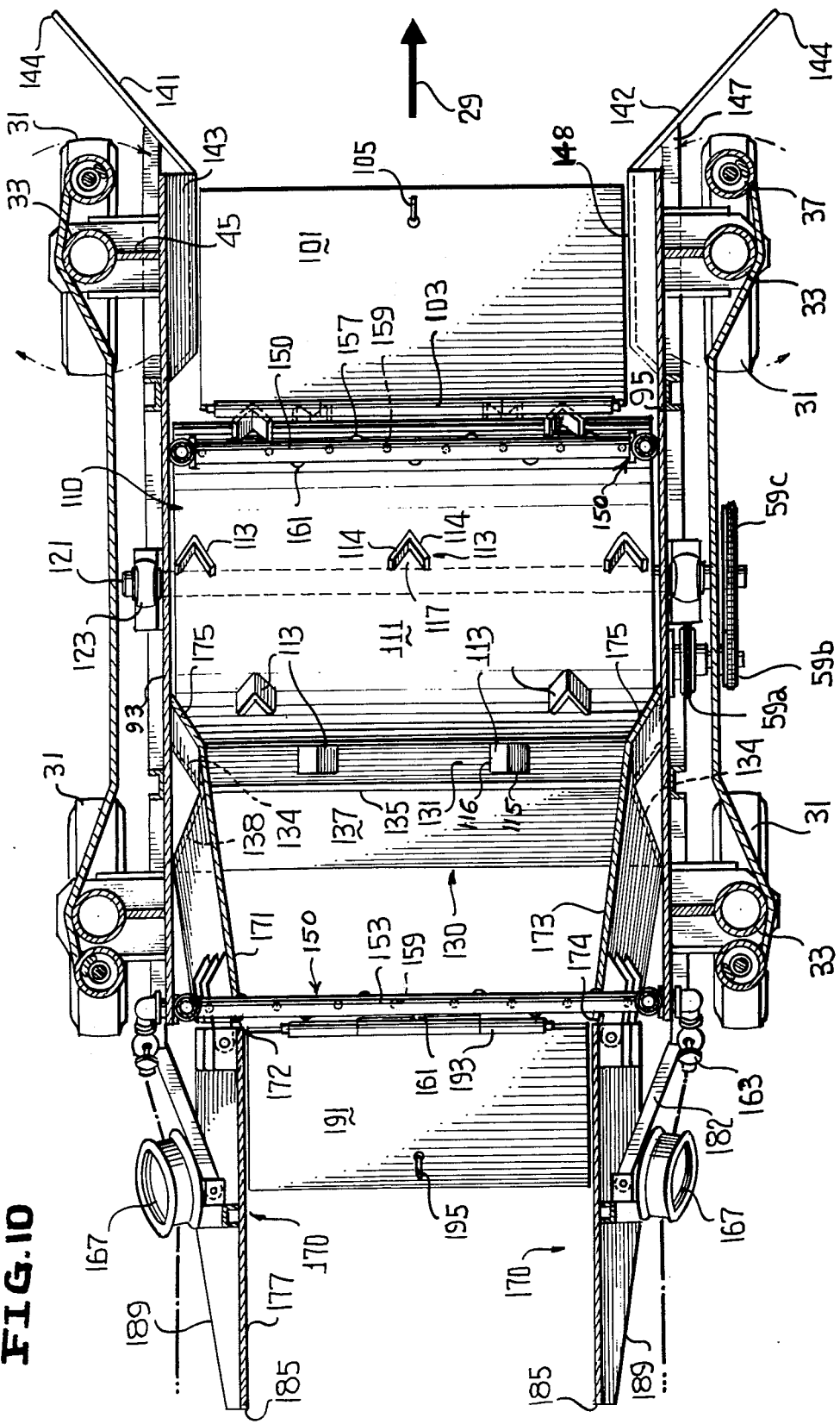

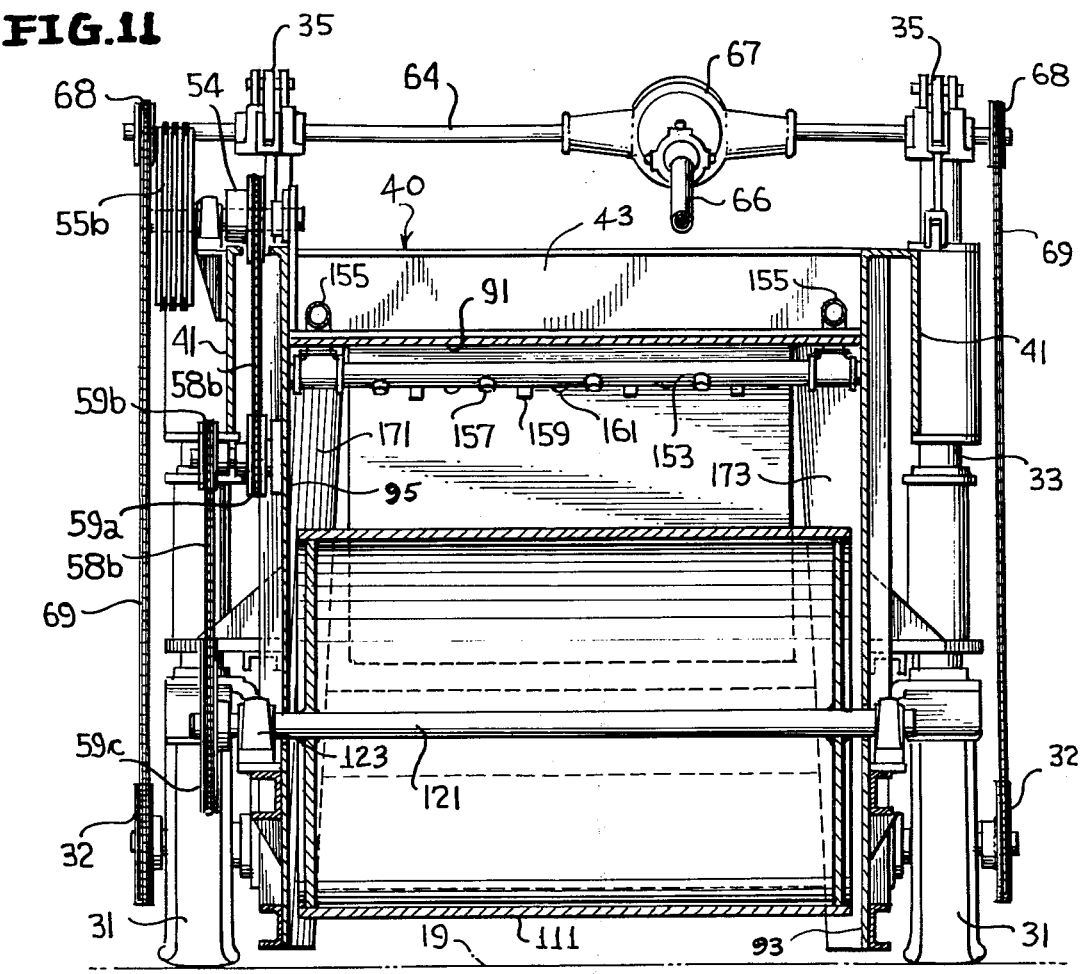
FIG. 11
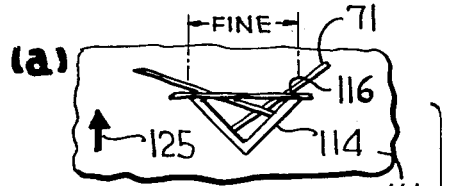
(a)
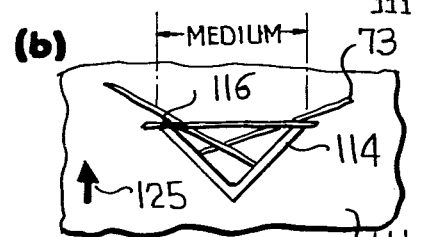
(b)
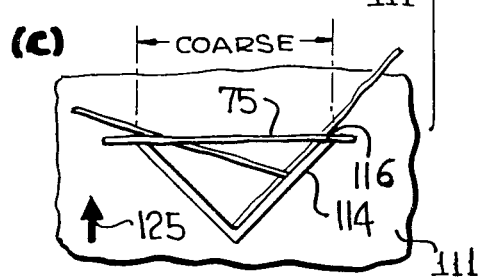
(c)
FIG 12
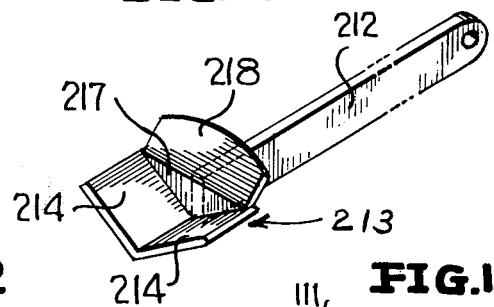
FIG. 14
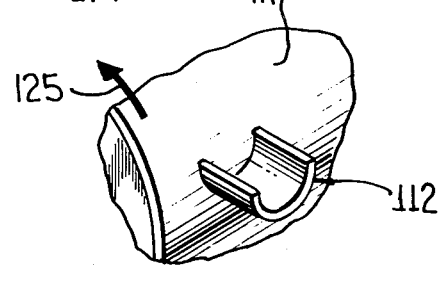
FIG. 15

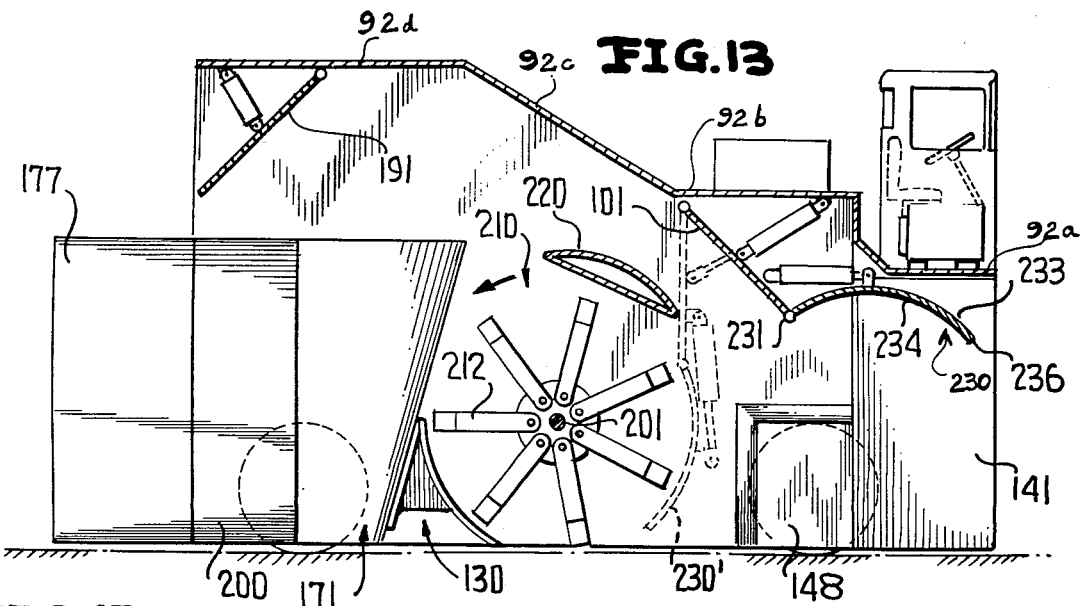
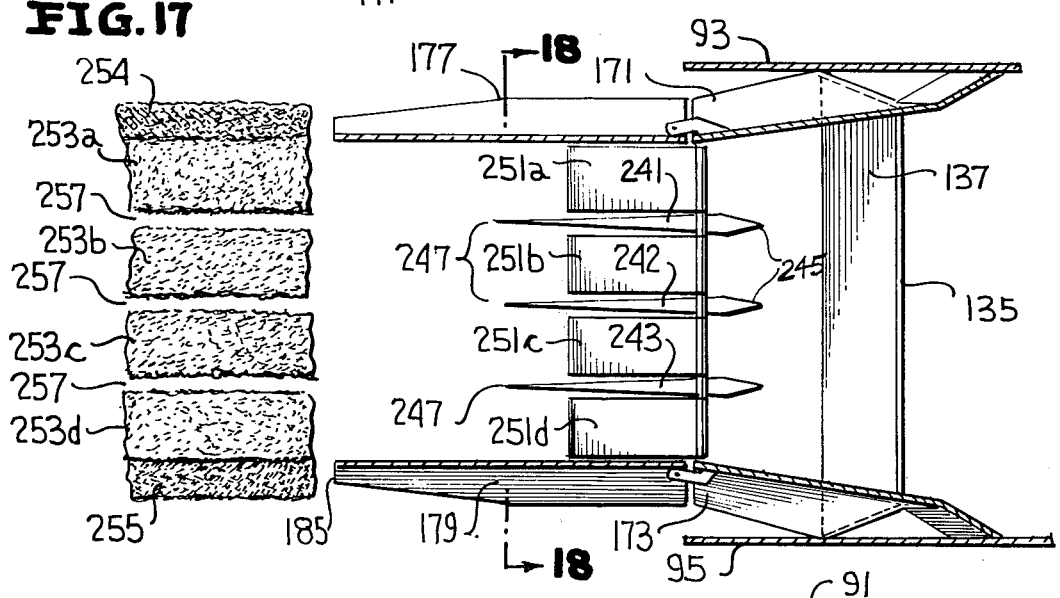
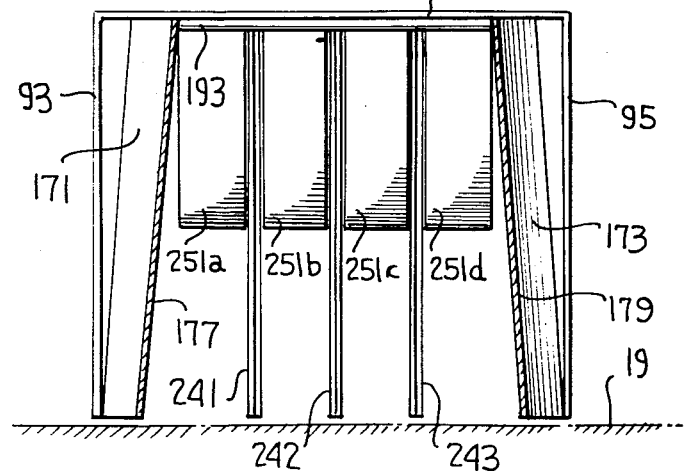

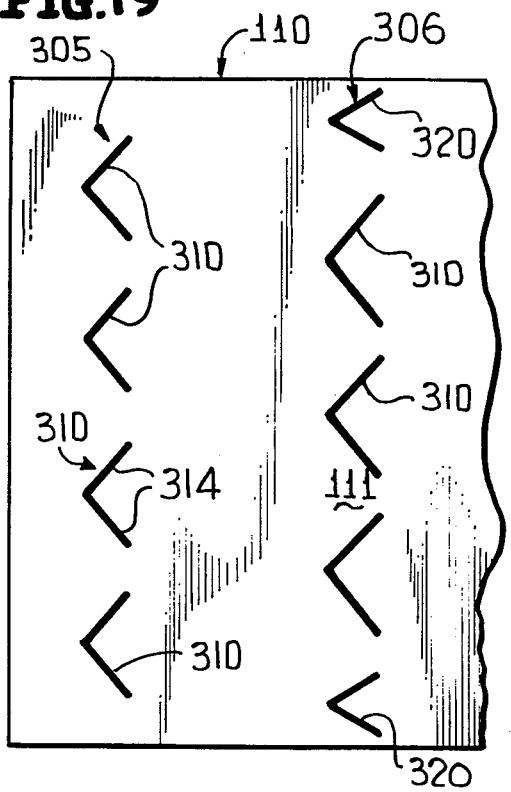
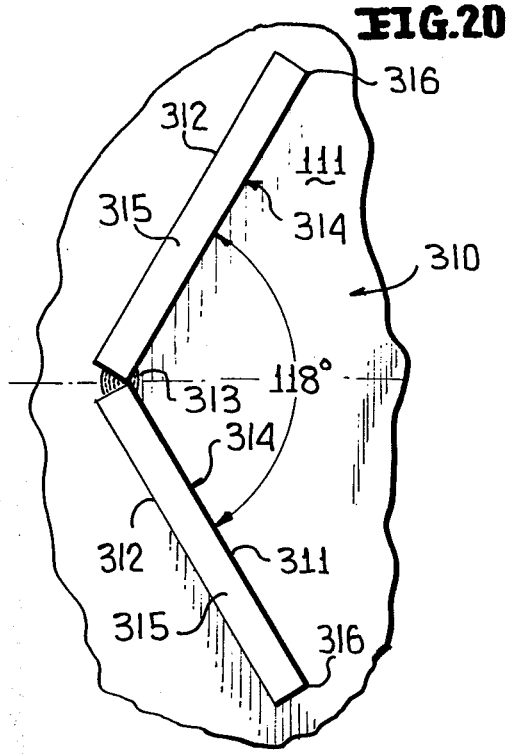
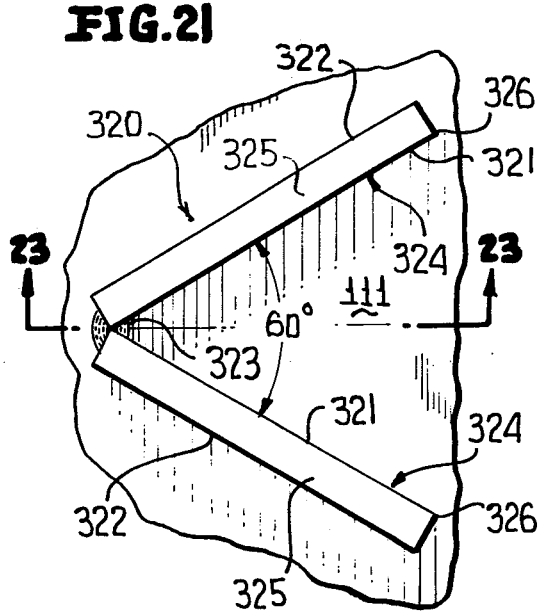
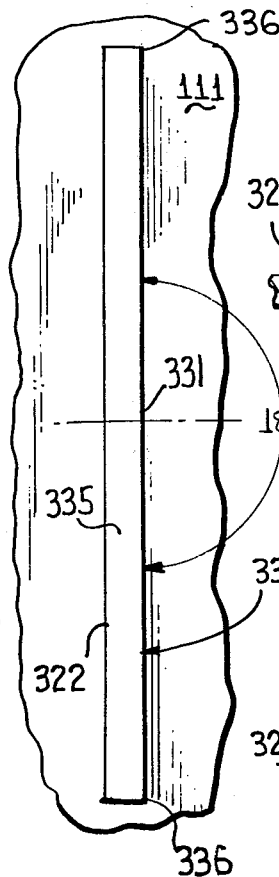
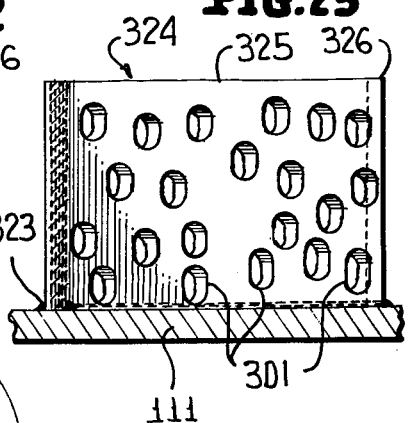
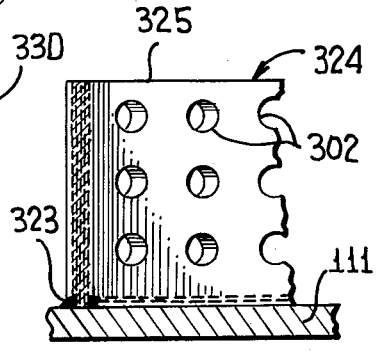

SCOOP MEANS AND ARRANGEMENTS THEREOF FOR VEHICULAR COMPOSTING MACHINE

CROSS-REFERENCE TO RELATED APPLICATION

This application is a continuation-in-part of copending U.S. application, Ser. No. 241,129, filed Apr. 5, 1972 now U.S. Pat. No. 3,776,528, issued Dec. 4, 1973.

BACKGROUND OF THE INVENTION

1. Field of the Invention

This invention relates to the production of compost by the aerobic decomposition of waste materials such as agricultural wastes, animal manure and by-products, municipal and restaurant garbage, sewage products, leaves, and like decomposable waste materials. It particularly relates to an apparatus and method for providing periodic aeration, hydration, and shaping of aerobically decomposable waste materials whereby a useful compost is inexpensively formed.

2. Review of the Prior Art

It is widely recognized that the ecology of technologically advanced countries is being threatened by a number of practices for which inexpensive solutions have not yet been found. One such practice involves the dispostion of solid wastes by burning, ocean dumping, and landfill.

Ecologically significant results thereof include progressive mining of top soils, by consumption of humus and trace elements through repeated applications of mineral fertilizers and production of crops in high yields, contamination of the oceans, and pollution of air in the vicinity of large cities. Landfill, a presently preferred method, requires large amounts of land which is becoming ever scarcer. Trends toward use of throw-away personal clothing, hospital gowns and bed sheets, motel bed sheets, etc., can be expected to aggravate this situation.

If an inexpensive method and apparatus can be made available for aerobically converting agricultural wastes, such as corn cobs, wheat straw, bagasse, and manure, forestry wastes, such as sawdust, bark, and wood particles, municipal wastes, such as municipal garbage and restaurant garbage, and industrial waste, such as wood-pulp by-products and food processing waste, into useful composts, ecology benefits can be two-fold: by improving soils and by reducing air, water, and land polution. Such a method and apparatus are not now available for large-scale use in converting aerobically decomposable waste materials into composts.

Compost is a dark, humus-type material which is useful as a fertilizer, as top soil, and as a mushroom growing medium at its intermediate stage. It may be formed by aerobic decomposition of waste materials with substantially no other emitted odors than those of a moist forest floor. During natural aerobic decomposition, a period of several months is required when the waste material, containing sufficient nitrogeneous materials for the micro-organisms, is merely heaped in piles for decomposition thereof. In order to attain an economically practicable decomposition rate, it is consequently well recognized that the waste material must be maintained in a moist condition and must be at least periodically aerated. Aeration may be considered to be a solid-air mixing operation.

When a compost has been completely decomposed, it is often also desirable to balance its high humus content with clay and sand, as by mixing together the compost and a selected preparation of a clay subsoil and sand for manufacture of a loam. It may also be desirable to add selected quantities of minerals containing chemical elements that are to be available in major or in trace amounts within the prepared top soil. Such minerals may be added in liquid form or as finely divided solids. Mixing of solids on a large scale may also be required, for example, in processing operations where aging and large-scale storage are involved. However, handling and mixing of one or more nonflowable solids is a difficult, slow, and energy-consuming operation that requires high capital investiment with presently available methods and apparatus.

Some manure-turning devices of the prior art, such as U.S. Pat. No. 1,827,358 of Giletti, utilized rows of pick-up tines, mounted on a beater roll, which were slowly revolved into a pile of material to pick up a load, and further employed rows of break-up tines, attached to a breaker roll mounted behind and above the beater roll, which were revolved at a greater speed than the pick-up tines to dislodge the clumps of the picked-up loads from the pick-up tines and break them up and then deposit the broken material behind the beater roll.

As an example of prior attempts to mix non-flowable solid materials, U.S. Pat. No. 2,994,591 of Toto describes a vehicular composting machine which is adapted for moving piles of manure to a beater for conditioning thereof in preparation of mushroom composts.

U.S. Pat. No. 3,369,797 of Cobey discloses a straddle-frame compost-turning vehicle having a longitudinally extending passageway therethrough in its direction of travel and a transversely disposed, rotating drum having helically disposed teeth projecting outwardly therefrom. The teeth have angularly inclined throwing surfaces. Vertically disposed, hydraulically adjustable retaining wings in transversely spaced relationship define the feed and discharge throats of the passageway. The machine acts upon a mass of raw material, such as raw manure deposited in a row, by straddling it, slicing into it with the projecting teeth, and throwing fragments upwardly and rearwardly to form a uniform windrow therebehind. The width of the windrows may be decreased, as composting proceeds, by adjusting the discharge wings. The windrow, however, tends to be low in height, the teeth require frequent replacement, and the raw material is chopped too finely for good aeration.

U.S. Pat. No. 3,565,585 of Engeler discloses a vehicular composting machine which comprises an inclined conveyor for picking up the compost, a conduit for spraying water onto the conpost through nozzles, a stripping roller having flexible teeth, and another roller having similar teeth through which air is directed into the compost.

A troublesome structural characteristic of a rick under usual atmospheric conditions is a tendency to develop differences between its exterior and interior portions, caused by exposure of the material at and near the surface to the atmosphere, so that the surface material may be thoroughly wetted by rain or be solidly frozen or become dry because moisture is able to evaporate and permeate outwardly and oxygen is able to permeate inwardly through a narrow surface zone along the top and sides of the rick. Usually, as compared to material in the interior of a rick, the material in the top and sides becomes drier, decomposes more slowly, and contains longer pieces of straw. On the other hand, formation of anaerobic conditions in this surface material is never a problem. Particularly because of its relatively dry and strawy nature, compaction of the surface material also tends to be less troublesome than for interior material.

In prior art composting machines, means were generally provided for reversing the dry parts at the edges of the rick and the wetter parts in its interior portion, such as the deflecting webs or ribs 21 of U.S. Pat. No. 1,827,358 and the angularly inclined throwing or impact surfaces 47 of the teeth 44 of U.S. Pat. No. 3,369,797. No consideration appears to have been given, however, to special handling of the side material. A need consequently exists for a scoop means that compensates for the relative dryness and strawiness of the side material by more intensively chopping the side portions of a rick and thereby reducing its strawy characteristics in spite of its relatively greater dryness.

A very pertinent characteristic of waste material disposed in the interior portions of a rick is its compactability under high impact loads. Such compactability is probably related to the porosity and compressibility of the waste material when subjected to the high impact energy of an incoming scoop means whereby dewatering and densification occur very rapidly. A practical consequence of mixing highly compactably materials with the vehicular composting machine of U.S. Pat. No. 3,776,528, of which this invention is a continuation-in-part, is that dense clumps, resembling balls, tend to be formed therefrom and are slung rearwardly onto the newly aerated rick. These balls are acted upon reasonably satisfactorily by the aerobical bacteria when inside the aerated rick but become hard and resistant to decomposition when on the surface thereof. In addition, such compaction tends to form a fillet-resembling, compact, semi-permanent mass in the right-angled region where a scoop joins the surface of a beater drum, thereby reducing the clump holding capacity of a scoop and consequently the mixing capacity of the vehicular composting machine of U.S. Pat. No. 3,776,528.

There is consequently a pronounced need for a scoop means having a compaction control means. It has been found that such a compaction control means comprises a pressure means and a dewatering means.

Some materials have a high cellulosic content, e.g., corn cobs, straw, hay, waste paper, and the like. Even if very wet, a dewatering means may be a sufficient compaction control means therefor. Other materials have little or no straw, are mucky, and are highly compactable. They generally require a scoop means having a pressure means and, if reasonably wet, a dewatering means as well for adequate control of compaction.

Sidewise compressive pressure is inherently exerted upon a retained clump by the blades of a paddle-type scoop or by the sides of a rounded scoop as disclosed in U.S. Pat. No. 3,776,528, and compression under the impact and rapid curvilinear acceleration thereafter to the peripheral speed of a clump, when caught by a scoop means at a peripheral speed of up to 33 miles per hour, can have a drastic compacting effect which appears to vary directly with the cosine of the angle of inclination of a paddle blade to the direction of travel thereof.

Removing water from the vicinity of a scooped-out clump during impact and subsequent revolution at the peripheral speed toward its departure position tends to reduce cohesion of the material and minimize the observed tendency of compacting to form balls.

SUMMARY OF THE INVENTION

It is, accordingly, an object of this invention to provide a method and apparatus for mixing of non-flowable solids disposed stripwise upon a flat surface.

It is also an object to provide an aerobical decomposition method that is suitable for large-scale production of compost from waste materials and an apparatus therefor.

It is another object to provide a method and apparatus for periodically moving through a compact strip-type rick of aerobically decomposable waste materials with aeration, fragmentation, hydration, and shaping operations, whereby aerobic decomposition is maintained until a selected compost is obtained.

It is an additional object to provide a method and apparatus for liftingly detaching clumps of aerobically decomposable waste materials from an endwise wall of a compact rick thereof, fragmenting these clumps, hydrating the product thereof, and re-forming an aerated, hydrated rick with compressed sides, a flat top and nearly square cross-section therebehind.

A particular object of this invention, as an improvement upon the composting machine of U.S. Pat. No. 3,776,528, of which this application is a continuation-in-part, is to provide scoops having a pressure means for obtaining sidewise compressive forces of a selected magnitude, as one form of a compaction control means, to act upon the detached clumps at the moment of impact and curvilinear acceleration immediately thereafter.

Another object is to provide scoops having a dewatering means for selectively dewatering the detached clumps enclosed by the scoop means, as another form of the compaction control means.

A further object is to provide a differential chopping means for creating more intensive chopping of material in the side portions of a rick as compared to the interior portion of the rick.

An additional object is to provide a capacity means for increasing the capacity of the composting machine without inducing compaction of the scooped-out clumps.

DESCRIPTION OF THE INVENTION

In satisfaction of these objects and in accordance with this invention, the mixing method of this invention for non-flowable solids disposed stripwise on a flat surface comprises:

A. liftingly removing solids from an upstanding endwise wall thereof,

B. revolving the solids upwardly and rearwardly,

C. slinging the revolved solids rearwardly,

D. downwardly reflecting at least a part of the slung solids between upwardly and rearwardly converging side compressing surfaces to form an aerated rick therebetween, and E. leveling the top of the aerated rick.

For non-flowable solid material having a propensity to form clumps and disposed stepwise on a flat surface, the mixing method of the invention comprises:

A. forwardly and upwardly revolving a scoop means into an upstanding endwise wall of the solid material;

B. detaching clumps therefrom with the scoop means;

C. breaking each oversize clump, by inertial forces generated therewithin, into a scoop portion and a projecting portion;

D. slinging the projecting portions against a forwardly and downwardly inclined front deflecting surface;

E. classifying the projecting portions by rearwardly rebounding for a distance varying in inverse proportion to size thereof;

F. rearwardly slinging the heavier and denser scoop portions and any rebounding projecting portions which are intercepted by the scoop means beneath a ceiling surface and toward and between a shaping means having a rearwardly and downwardly inclined baffle surface which is disposed between rearwardly and upwardly converging side compressing surfaces;

G. slinging the lighter and bulkier scoop and intercepted projecting portions rearwardly and downwardly upon the flat surface to form the bottom part of an aerated rick;

H. downwardly reflecting the heavier and denser portions contacting the baffle surface onto the top of the bottom part of the aerated rick to form the upper part thereof; and I. levelling the top of the aerated rick.

Projecting portions from the largest oversize clumps are apparently slung farther forwardly, probably because the portion of a large clump that projects beyond the scoop means, having no support for its rapidly increasing inertial forces, prematurely breaks off from the portion which is supported by the scoop means and moves tangentially, with respect to the path of revolution of the scoop means, from the point of such break-off according to elementary laws of physics. The larger the projecting portion, the earlier the break-off seems to occur, so that the very large projecting portions are thrown so far forwardly that they rebound toward the endwise wall of the solid material or onto the top thereof, to be acted upon again by the advancing scoop means, whereby classification occurs.

The method of U.S. Pat. No. 3,776,528, of which this application is a continuation-in-part, for liftingly detaching clumps of aerobically decomposable waste materials from an upstanding endwise wall of a compacted rick thereof, comprises curvilinear movement of a scoop means at relatively high speed and at high momentum into this substantially rigid material. Therefore, if a rotatable beater drum is used for mounting and revolving the scoop means, it must be adequately powered and relatively heavy. Peripheral speeds for the beater drum are much greater than speeds used in most prior art machines but nevertheless must be within a peripheral speed range that is suitable for the materials being mixed, such as mixing waste materials with air for composting. If the peripheral speed is increased beyond the peripheral speed range, the scoops simply tear through the rick without detaching clumps therefrom. In general the faster the speed, the finer the material that is slung rearwardly, but if fineness exceeds a certain optimum, the quantity of air in the aerated rick decreases.

Within this peripheral speed range that gives optimum clump detachment and an optimum air mixture, it has been found that the scoop means should have a straight slide surface that is radially disposed to the drum (i.e., perpendicularly attached to the drum surface), in contrast, for example, to the curvature of the tines 8 of the Giletti machine. The radial disposition of the scoop means insures optimum release of the scooped-out material in a generally rearward direction with some being sent rearwardly. This slide surface should also be unimpeded by obstructions and substantially smooth.

It has further been found that the scoop means has an optimum length, measured radially from the drum surface, which is interrelated with rotational speeds of the beater drum, characteristics of the waste materials in the rick, and forward speeds of the machine. This optimum length is 6 inches, as found after trials with commonly used materials that included radially measured lengths of 8 and 14 inches. Increasing the radially measured length beyond 6 inches gave increased capacity but created compaction problems.

More specifically, this aeration, hydration, and shaping method for composting waste material comprises the formation of an elongated, compacted strip of the waste material upon a flat surface, revolvingly moving a scoop means forwardly toward one endwise wall of the compacted strip and upwardly from the flat surface while inwardly compressing the sides of the compacted strip, liftingly tearing into the endwise wall to disengage a plurality of clumps therefrom, breaking off projecting portions from oversize clumps, forwardly and upwardly slinging the projecting portions and classifying them during rebound from a front deflecting surface, hydrating and rearwardly slinging material held or intercepted by the scoop means onto a hard rear baffle surface against which the clumps are disintegrated and from which the waste material is reflected onto the flat surface to form an aerated strip, and leveling the top surface of the aerated strip while exerting shaping pressure upon the sides thereof to obtain a rick having a nearly square cross section and compacted sides. This method does not shave the endwise wall but instead tears out clumps and thereby maintains straw length generally equalling the dimension of the scoop means whereby the aerated rick is maintained in highly bulked condition, and the finished mushroom compost retains sufficient straw or hay stems of selected length that it has adequate permeability to air during the mycelium growth stage.

This operation is repeated every 3 days during normal weather upon each compacted rick. Winter temperatures as low as −20°F. merely extend the heating period for 1 to 2 days. Steam heating of the underlying support surface may then be practicable if a production schedule must be maintained.

For mushroom cultivation, the compost should be available at an intermediate stage when the compost has sufficient bulk to retain moisture and air that the mycelium needs for feeding on killed bacteria. For other agricultural uses and for forming topsoil, however, the compost should be completely decomposed and should be turned about 6 times instead of 3 times as is needed for mushroom composts.

A rick is herein defined as an elongated strip made of aerobically decomposable material and having slightly tapered and compressed sides and a flat top. Typical rick measurements, before decomposition begins, are a bottom width of eight feet, a top width of 7 feet, a length of 300 feet, and an initial height of 7 to 9 feet. Shrinkage in height during the halfway decomposition for optimum formation of mushroom compost is generally about 30–40 percent. The moisture content of this mushroom compost is about 65–80 percent.

Composts for mushroom cultivation are presently made from a mixture of ground corn cobs and alfalfa and a relatively small amount of chicken manure. Initial bulk density data for ground corn cobs is about 340–360 air-dry pounds per cubic yard, the material being at about 15 percent moisture content. Initial bulk density for ground alfalfa is about 100–150 air-dry pounds per cubic yard. Hammer-milled garbage is believed to have an average dry density similar to that of corn cobs. Nitrogen content should be 1.5 percent dry basis.

The vehicular composting machine of this invention continuously advances through and ingests a compacted rick with a clump scooping means, a clump disintegration means, a nitration and hydration means, and a rick reforming means, whereby the machine continuously displaces the entire compacted rick and continuously rebuilds therebehind an aerated, fragmented, and selectively nitrated and hydrated rick. This machine comprises a straddle carrier vehicle of known construction having a frame and a power supply means, a tunnel means which is straddled by and attached to the vehicle, a rick intake means which is disposed at the front end of the vehicle, a beater means which is disposed at the front end of the vehicle, a beater means having the scoop means projecting outwardly therefrom, a scavenger means, a hydrating means if necessary, and a rick shaping means at the discharge end of the vehicle. The beater means is disposed transversely to and approximately midway of the longitudinal axis of the vehicle and within the tunnel means so that the vehicle is divided into an intake section and a discharge section. The beater means is rotatably supported by the vehicle and is operatively connected to the power supply means.

The tunnel means comprises a horizontally disposed ceiling which is rigidly attached to the frame, a pair of vertically disposed tunnel walls which are conjoined to the ceiling and rigidly attached to the frame, and an impact deflector which is hingeably attached to the celing at the intake end of the vehicle. The impact deflector is hinged approximately vertically above the forwardmost edge of the beater means and is adjustably suspended by an adjustment means which permits the impact deflector to be positioned for deflecting most of the slung material, received from the scoop means, toward the upper portion of the beater means along a zone of return impact forward of the topmost edge thereof.

The rick intake means comprises a pair of laterally spaced and outwardly diverging intake side sweepers and a pair of inwardly bulging wheel wells. The intake side sweepers are attached to the tunnel walls and, in cooperation with the wheel wells, form a guiding means for the vehicle whereby the vehicle is able to follow the rick upon which it is being operated without attention by an operator. The sweepers may be rigidly or hingeably attached to the tunnel walls and preferably are hinged and hydraulically operated.

The rick shaping means comprises a pair of discharge side compressors and a discharge top baffler positioned therebetween and hingeably attached to the ceiling at the discharge end of the vehicle. The pair of discharge side compressors mutually converge upwardly and rearwardly. The pair of discharge side compressors comprises a pair of packing compressors, each being rigidly attached to one of the tunnel walls, and a pair of shaping compressors, each being hingeably attached to one of the packing compressors. The discharge top baffler reflects slung material downwardly and, if received directly from the beater means, also forwardly toward the scavenger means. Structurally, this baffler may be considered part of the tunnel means, but functionally it interacts with the packing compressors and the scavenger means to form the aerated rick.

The beater means principally comprises a rotation means and a scoop means, such as a hammermill having a scoop means attached to each hammermill arm, but preferably comprises a beater drum and a plurality of scoop means attached to, and in combination with, the surface thereof. Each scoop means has an open outer end, two outer corners, and an open side facing the direction of revolution of the beater drum. The closed side may be rounded, such as is formed by a longitudinal half-section of pipe, or may be angular, such as is formed by a longitudinal section of angle iron, to make a beater paddle. The pair of angularly attached blades of a beater paddle are disposed mutually perpendicularly and in radial alignment with the beater drum surface whereby a concavity is formed between the pair of blades and in combination with the surface of the beater drum. This concavity faces forwardly in the direction of rotation of the drum, whereby the concavity, with its bounding structure, performs as an upwardly and forwardly revolving scoop as the drum rotates. The beater paddles are preferably disposed in longitudinal rows spaced 60° apart along the periphery of the beater drum and are preferably circumferentially disposed along approximately a 45° relationship to the longitudinal rows.

The hard edges of the beater paddles tear into the wall of waste materials at the exposed end of the compacted strip upon which the beater paddles are operating. By liftingly and forwardly tearing into this wall, clumps are disengaged therefrom. The clumps generally are larger than the concavity and are curvilinearly accelerated as the drum moves upwardly. This acceleration generally breaks an oversize clump into a scoop portion which is retained by the concavity and a projecting portion which is slung upwardly, at about 30° forward angle, into contact with a forwardly and downwardly inclined impact deflector which rebounds the projecting portion toward the upper part of the beater drum. The scoop portion, however, is generally retained until the paddle has approximately at least reached its topmost position, whereupon the retained scoop portion has acquired enough velocity and consequently enough centrifugal force to slide outwardly beyond the paddle and be slung rearwardly toward the ceiling and/or the discharge top baffler and/or the ground or flat surface upon which the vehicle is operating. The coefficient of friction, between the scoop portion and the inner surfaces of the blades, and the mass of each scoop portion seem to be the determining factors as to its departure position along the drum periphery.

In furtherance of the object of created sidewise compressive forces of a selected magnitude upon the scooped-out clumps, the paddle-type scoops of this invention, as an improvement over U.S. Pat. No. 3,776,528, of which this inveniton is a continuation-inpart, are herein provided in selectively narrowed or in flattened form, as compared to the perpendicular relationship shown in FIGS. 12 and 14, preferably with angles between the blades of approximately 60°, 118°–126°, or 180°. The advantages of flattened paddle-type scoops can be summarized as increased travel speed, increased throughput, greater porosity of the aerated rick, less ball formation, and self-cleaning of the scoops. In accordance with the dewatering object, scoops are herein provided with holes or perforations therein, particulary close to the drum surface, through which water can be removed while the clumps are being revolved.

In satisfaction of the object for differentially chopping strawy materials in the side portions of a rick as compared to its interior portion, the scoops at the extremities of the beater drum and in every alternate row have much narrower widths than the remainder of the scoops.

To satisfy the object of increasing the capacity of the composting machine of U.S. Pat. No. 3,776,528, without inducing compaction effects, a capacity means comprising a staggered arrangement of flattened scoops in each alternate row and an increase in the number of scoops, by using a transverse row spacing of about 40 inches and a between-scoop distance along a transverse row of about 24 inches, is herein provided. Use of this capacity means has enabled the ground speed of the machine to be almost doubled.

The scavenger means comprises an arcuately shaped plow having a forwardly disposed shave edge which is disposed transversely to the vehicle and in annular relationship to the beater drum at the forefront of the discharge section of the machine. The shave edge faces toward the front end of the vehicle and is aligned with the bottom edges of the tunnel walls so that, in cooperation with the beater drum, it completely removes the last part of the compacted rick.

The scavenger means further comprises a barrier guide which is rigidly attached to the plow along the top edge thereof and is rigidly attached to the packing deflectors at its ends. The barrier guide more effectively separates the continuously forming aerated rick from the beater drum and helps to form the lower part of the sloped front wall of this aerated rick by stopping reflected material from the discharge baffler and guiding it downwardly to form this continuously advancing sloped endwise wall into which some scoop portions are slung directly. Scoop portions slung against the ceiling and then against the discharge top baffler are impacted upon this sloped endwise wall to build it to a level slightly higher than the bottom edge of the discharge top baffler.

The hydrating means comprises a front header and a rear header which are disposed transversely of the longitudinal axis of the vehicle and straddling the beater drum. These headers are connected to an extensible water supply means. Water, a chemical solution, or a trace-element slurry is sprayed therefrom through a plurality of nozzles which are selectively disposed to direct water forwardly, downwardly, and rearwardly. For mixing operations wherein aerobical decomposition is not needed, the hydrating means need not be installed in the vehicular composting machine.

The power supply means of this vehicle may be gasoline, diesel, or LP-gas powered. Engines of 120 to 200 horse power are suitable. The vehicular composting machine of this invention moves through a rick at up to 7 feet per minute, although adding a greater number of scoops and operating the beater means at a higher rotational speeds significantly increases this speed. A typical speed of operation, for a machine having a minimum of scoops for optimum bulkiness of the aerated ricks formed therewith, is about four feet per minute. Operating speeds on a highway are typical for straddle carrier vehicles and may be up to 25 mph.

As the waste material aerobically decomposes, successive aeration-hydration-shaping operations encounter a progressively more friable material so that a clump disengaged therefrom tends to be more nearly the same size as the scoops and is slung rearwardly without breaking a projecting portion therefrom.

Consequently, it is feasible and within the scope of this invention to provide machines having diverse scoop means. One vehicular composting machine can thus be provided which is suitable for the first aeration; another vehicular composting machine can be provided having slightly different scoops which are more nearly suitable for dealing with more friable material; and a third machine can be provided having paddles which are suited for very friable material, such as paddles having larger blades or scoops with curved cutting edges. In the vehicular composting machine specialized for the first aeration, for example, scoops may be of pitchfork type having a plurality of tines of suitable length, thickness, and curvature, depending upon the proportion of projecting and scoop fractions which are desired.

BRIEF DESCRIPTION OF THE DRAWINGS

The vehicular composting machine of this invention and the compost aerating method of this invention may be understood more clearly by referring to the drawings, as follows:

FIG. 1 may be considered to be a cross-sectional view looking in the direction of the arrows 1—1 in FIG. 2.

FIG. 6 is a diagrammatic perspective view of the hydraulic power means and rear wheel drive means for the machine.

FIG. 7 is a diagrammatic perspective view of the drum drive mechanism.

FIG. 8 is a right-side elevation view, looking in the direction of the arrows 8—8 in FIG. 4, with the beater means and scavenger means indicated in phantom.

FIG. 9 is a sectional elevation view showing the left side of the machine, looking in the direction of the arrows 9—9 in FIG. 4.

FIG. 10 is a sectional plan view looking in a direction of the arrows 10—10 in FIG. 8.

FIG. 11 is a sectional elevation view looking in the direction of the arrows 11—11 in FIG. 8, looking towards the rear of the machine.

FIG. 12 represents three sizes of paddles on the beater drum and typical positions for straw crossed in the concavitites thereof.

FIG. 13 is a diagrammatic sectional elevation view of another embodiment of the vehicular composting machine having a tunnel means with a raised ceiling in the discharge section, a hammermill beater means, a carom deflector thereabove, a funnel compressor, and a curved safety shield which is hingeably attached to the bottom edge of the front deflector.

FIG. 14 is a perspective view of a hammermill arm and scoop used in the hammermill beater means of FIG. 13.

FIG. 15 is a fragmentary perspective view of a rounded scoop attached to a fragment of the beater drum surface.

FIG. 16 is a top view of the right tunnel wall in the discharge section of the embodiment shown in FIG. 13, which shows the funnel compressor hingeably attached thereto and the slide mounting for the shaping compressor.

FIG. 17 is a diagrammatic plan view of a multi-rick embodiment of the vehicular composting machine, which is particularly suitable for solid waste composting operations on a large sclae, and a fragment of a quadri-rick formed therewith.

FIG. 18 is a sectional elevation view, looking in the direction of the arrows 18—18 in FIG. 17, which shows the discharge end of the multi-rick embodiment of FIG. 17.

FIGS. 19—24 show improved beater paddles and arrangement thereof embodying the capacity means, the differential chopping means, the pressure means, and the dewatering means of this invention as improvements for use with the vehicular composting machine of U.S. Pat. No. 3,776,528.

FIG. 19 is a front view of the lower half of a beater drum on which are selectively mounted two embodiments of the scoop means in the form of beater paddles to provide the capacity means and the differential chopping means.

FIG. 20 is an end view of a flattened beater paddle, attached by welding to a fragment of a beater drum surface, having a 118° angle between its blades.

FIG. 21 is an end view of a narrowed beater paddle, attached by welding to a fragment of a beater drum surface, having a 60° angle between its blades.

FIG. 22 is an end view of a flat beater paddle,, attached by welding to a fragment of a beater drum surface and formed of a single blade so that it can be considered to have a 180° angle between the end portions thereof.

FIG. 23 is a sectional elevation of the narrowed beater paddle of FIG. 21, looking in the direction of the arrows through the center thereof, showing one blade and typical elongated perforations with which any of the beater paddles or other embodiments of the scoop means shown and described in Ser. No. 241,129 can be equipped to form a dewatering means.

FIG. 24 is a sectional elevation of the narrowed beater paddle of FIG. 21, looking in the direction of the arrows through the center thereof, showing one blade and typical circular perforations with which any of the beater paddles or other embodiments of the scoop means shown and described in Ser. No. 241,129 can be equipped to form a dewatering means.

DETAILED DESCRIPTION OF THE PREFERRED EMBODIMENTS

Figure 1:
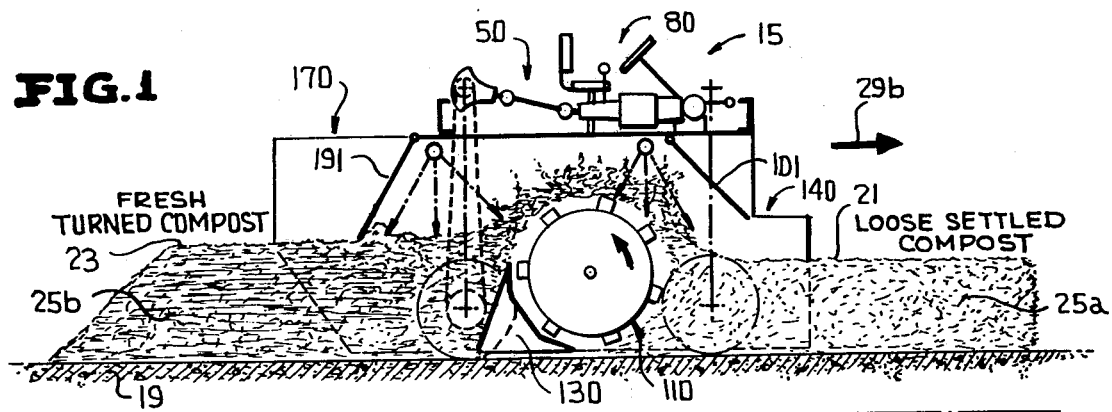
FIG. 1 is a diagrammatic side elevation of the vehicular composting machine as it is passing through a rick of compost.

The vehicular composting machine 15 shown in the drawings comprises a straddle carrier vehicle 30 which comprises a frame 40, a power supply means 50, a pair of laterally spaced and vertically disposed front posts 33 which are rotatably attached to the frame 40, a pair of laterally spaced and vertically disposed rear posts 33 which are attached to the frame 40 and are longitudinally spaced from the front posts 33, four wheels 31, each being rotatably attached to one of the posts 33 at the bottom thereof, a wheel drive means 61 which is operatively connected to the power supply means 50, a drum drive means 51 which is also operatively connected to the power supply means 50, and a steering and control means 80.

The straddle carrier vehicle 30 is of conventional type. Its wheels 31 may be adjusted within narrow limits by a height control means comprising a rocker arm 35, a height-control knob 36, and a spring 37. The frame 40 comprises longitudinal box channels 41, cross channels 43, and post support lugs and collars 45 by means of which the wheel posts 33 are attached to the channels 41. The highly preferred height control means is fully hydraulic and comprises a hydraulic cylinder at each wheel post 33 whereby the entire machine is raised or lowered with respect to a flat supported surface, such as the concrete wharf 19.

The power supply means 50 comprises, as clearly shown in FIGS. 6 and 7, a wheel drive means 61 and a drum drive means 51. The drum drive means 51 is taken directly from the main power unit 52 by means of sheaves 55a, 55b which are connected with a V-belt drive 56. The power is then transmitted through an overriding clutch 54, drum drive chains 58a, 58b, and sprocket wheels 59a, 59b to the drum drive sprocket 59c. The wheel drive means 61 comprises the hydraulic pump 62 which is connected with a power take-off to the engine 52, a hydraulic power unit 63, a 10-speed transmission 65, a drive shaft 66, a differential 67, axles 64, and sprocket wheels 68 which move wheel drive chains 69. These chains 69 are connected to the wheel sprockets 32 whereby the rear wheels 31 are driven. In the highly preferred embodiments, all power transmission is hydraulic so that the drum drive means, the wheel drive means, and the steering and control means are all hydraulically driven.

Figure 5:
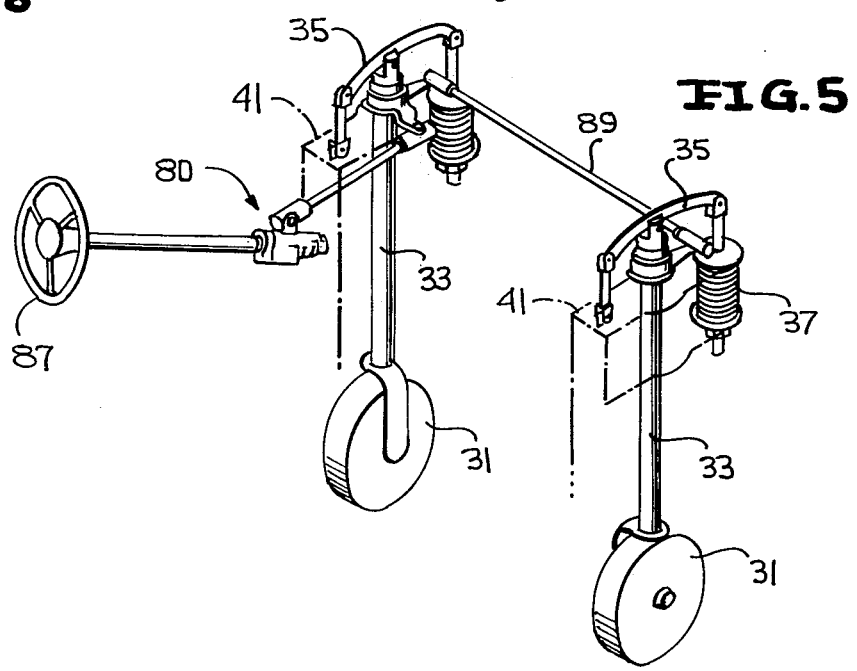
FIG. 5 is a diagrammtic perspective view of the steering mechanism and front wheel assembly.

The steering and control means 80, with which an operator sitting in the seat 39 steers and controls the vehicular composting machine 15, comprises a wheel reversal shift 83 and a transmission shift 85, shown in FIG. 6, and a drum control shift 81, shown in FIG. 7, which operates the clutch 53. The operator steers the vehicle with the steering wheel 87, as indicated in FIG. 5, which turns the front wheels 31 by means of the front tie rod 89.

The engine 52 may be gasoline, diesel, or LP-gas operated. The operator seat 39 is shown as being uncovered at the top of the vehicle 30, but it is preferred to place the operator in a covered cab at the front of the vehicle at a substantially lower elevation, such as at the front of the high-discharge embodiment shown in FIG. 13 with the engine alongside.

The vehicle 30 and its operative mechanism have been described in some detail hereinbefore in order that the operation of the vehicular composting machine 15 of this invention may be clearly understood. However, the straddle carrier vehicle 30 is not a part of this invention, and it should be understood that the inventive portion of this disclosure follows hereinafter. This inventive portion comprises the tunnel means 90, the beater means 110, the scavenger means 130, the rick intake means 140, the hydrating means 150, and the rick shaping means 170. However, the invention may be more descriptively dichotomized by listing the impact deflector means 101 separately from the tunnel means 90 and the discharge baffler 191 separately from the rick shaping means 170.

The tunnel means 90 comprises the ceiling 91, the tunnel walls 93, 95, and the impact deflector 101. The ceiling 91 is horizontally disposed and is rigidly attached to the frame 40. The pair of vertically disposed tunnel walls 93, 95 are conjoined to the longitudinally disposed side edges of the ceiling 91 and rigidly attached to the frame 40. The impact deflector 101 is hingeably attached to the ceiling 91 with the impact hinge 103 which is disposed transversely of the longitudinal axis of the vehicle 30 so to provide an arcuate path of travel 104. The impact deflector 101 is suspended by the adjusting cable 105 which is stored on the reel 107 which is operated by the handle 109. Because the bottom edge of the deflector 101, as shown in FIG. 9, is within the tunnel means 90 and a short distance above the top surface 21 of a compacted rick, the machine 15 performs the valuable function of sweeping the steam always associated with the aerobical decomposition into and through the tunnel means 90 so that the operator of the machine 15 is not bothered thereby and has uninterrupted vision. When projecting portions of oversize clumps break off from the scoop portion caught on the paddles 113 before acquiring high velocity and are deflected from the impact deflector 101 so as to fall back upon the compact rick 21, a wave-like crest 22a of loose material is created immediately ahead of the beater means, as shown in FIG. 9. Fresh air, sweeping beneath the bottom edge of the deflector 101, passes over this crest 22a and entraps the normally considerable quantity of steam which continually escapes from the sequentially and continuously exposed endwise wall in front of the beater means.

The high-discharge embodiment shown in FIG. 13 has a quadri-sectioned ceiling: the horizontally disposed front ceiling 92a upon which the operator's cab and the engine are disposed, the horizontally disposed ceiling 92b upon which the hydraulic power unit is disposed and to which the hydraulically operated deflector 101 is hingeably attached, the downwardly and forwardly inclined ceiling 92c, and the horizontally disposed rear ceiling 92d to which the hydraulically operated baffler 191 is hingeably attached. This embodiment is useful for very bulky materials. When a beater drum is used as the rotation means instead of the hammermill 210, a secondary pull-off roller (not shown in the drawings) is rotatably attached to the tunnel walls in parallel to the beater drum and with its shaft at about the top of the beater drum so that pull-off teeth on the pull-off roller, revolving at a higher speed than the periphery of the beater drum, can strip waste material therefrom.

Also shown in FIG. 13 is a carom deflector 220 above the hammermill 210 and a safety shield 230, which is hydraulically operated and hingeably attached to the bottom edge of the deflector 101 with the hinge 231, having a curved front surface 233, a curved rear surface 234, and a straight, horizontally disposed bottom edge 236. When deflector 101 is hydraulically moved to its vertical position, the shield 230 may be brought into close proximity to the beater means in its vertical position 230' whereby operating personnel can move about in front of the beater means and between the sweepers 141, 143 in complete safety.

Moreover, the safety shield is a very useful operating part of the vehicular composting machine for completely cleaning up the terminus of a compacted rick with a minimum of auxiliary labor. When this terminus, sloping away from the advancing machine, becomes lower than the shaft of the beater means, the scoops meet insufficient resistance to their forward and upward revolving motion and tend to toss material arcuately ahead so that the terminus becomes a very low and highly elongated strip ahead of the machine. By moving the shield 230 downwardly, the terminal material may be raked toward the beater means and compressed against the thrust of the scoops.

The beater means 110 comprises a rotation means, such as a beater drum 111, and a hammermill 210. The beater drum 111 has a scoop means, such as the rounded scoops 112, shown in FIG. 15, and the beater paddles 113 projecting outwardly therefrom, and a central shaft 121, which is rotatably supported in bearings 123 at either end thereof. The beater drum 111 is disposed transversely to and approximately midway of the longitudinal axis of the vehicle 30 and within the tunnel means 90 whereby the beater drum 111 divides the vehicle 30 into an intake section and a discharge section. Suitable rotation speeds for a beater drum 111 of a 6 foot diameter are 80–130 rpm.

The beater paddles 113 comprise and are formed by a pair of intersecting and rigidly attached blades 114 which are preferably disposed mutually perpendicularly and in radial alignment with the beater drum 111. The blades 114 have outward blade edges 115 and form a concavity 117 with the adjacent surface of the beater drum 111. These blade edges 115 describe a periphery of travel 119 with reference to which the height control means for the wheels 31 must be carefully adjusted. Each concavity 117 faces forwardly in the direction of rotation 125 of the beater drum 111, whereby the concavity 117 forms a scoop during rotation of the beater drum 111.

For optimum retention of bulkiness, the beater paddles 113 are preferably disposed in longitudinal rows spaced 60° apart along the periphery of the beater drum 111 and are preferably circumferentially disposed along approximately a 45° relationship to the longitudinal rows. The beater drum 111 is preferably about 6 feet in diameter but may be as small as 4 feet in diameter and as large as 9 feet in diameter for operating on settled ricks 25a having a top surface 21 which is 5 to 9½ feet above a concrete wharf 19. For very bulky ricks more than 9½ high, as may occur before the first aerobical dicomposition, it may be desirable to install a take-off roller whose teeth rake past the scoops on the drum surface as discussed hereinbefore for the high-discharge embodiment shown in FIG. 13.

The blades 114 project outwardly from the surface of the drum 111 for a distance of 6 inches so that a 7 foot periphery 119, as indicated in FIG. 9, is described for a 6 foot diameter drum 111. At rotational speeds of 80–130 rpm, peripheral velocities of 1,800–2,900 feet per minute are attained. However, other size relationships are feasible without departing from the principles of this invention.

Moreover, the hammermill 210, as shown in FIGS. 13 and 14, having a shaft 201, arms 212, and paddles 213, is effective on a wide variety of non-flowable solids. The paddles 213 comprise a pair of angularly disposed blades 214, a concavity plate 217, and a deflecting plate 218. Alternatively, the blades 214 may be replaced with the rounded scoop 112, shown in FIG. 15, by rigidly attaching the rounded portion thereof to the concavity plate 217. In general, any scoop means is satisfactory which provides a tearing action upon the endwise wall of waste material at one end of a settled rick 25a, liftingly scoops a clump therefrom during movement of the machine forwardly toward the endwise wall and upwardly from the concrete wharf 19, retains the scooped-out clumps during upward and rearward curvilinear movement, and thereupon slings the clumps rearwardly.

As shown in FIG. 12, a scoop may also vary in size. For beater paddles formed of a pair of angularly disposed blades 114, scoops may be classified as "fine," "medium," and "coarse," as shown in FIGS. 12a, 12b, and 12c, respectively. Clumps caught therewith are correspondingly varied in size, and the scoop portions thereof are proportionate as the sharp side edges 116 tear into the endwise wall of a rick. Of even greater significance for bulk retention is the effect of scoop size upon straw length for mushroom usage. As a general relationship, the straws 71, 73, 75 tend to be somewhat longer than the width across the edges 116 of the blades 114 but vary directly therewith. Widths of 6 inches across the edges 116 of the blades 114 have been used on a wide variety of solid materials and are considered to correspond to the medium classification of FIG. 12b.

FIG. 19 displays two longitudinally disposed rows 305, 306 of scoops attached to a fragment of the surface of a beater drum 111. The flattened paddle-type scoops 310 occupy all of the shorter rows 305 and all but the extremities of the longer rows 306 where the narrowed scoops 320 are disposed. The rows 305, 306 are 45° apart so that impact occurs at a given spot at 90° intervals. On a 9 foot diameter beater drum 111, the rows 305, 306 are consequently separated at intervals of about 41 inches, and similarly disposed scoops 310, 320 are circumferentially separated by 82 inches. The flattened scoops 310 within any row 305, 306 are 24 inches apart, and the narrowed scoops 320 at the extremities of the alternate longer rows 306 provide increased chopping action upon the relatively dry and strawy material at the edges of a rick as compared to the interior thereof.

Paddle-type scoops, having varied angular relationships between the blades thereof, which provide a pressure means for selective densification by obtaining sidewise compressive forces of a selected magnitude during impact and curvilinear acceleration of the detached clumps, are additionally shown in FIGS. 20, 21, and 22 as improved scoop means for use with the composting machine of U.S. Pat. No. 3,776,528.

The flattened beater paddle 310, shown in FIG. 20, is formed of a pair of blades 314 which are attached, as by welding, to the surface of a drum 111 and are conjoined, as by a weld 313, so as to have an angular relationship of approximately 118°. Any angle substantially greater than 90° and substantially less than 180° is to be construed, however, as a flattened beater paddle 310. Each blade 314 has a front side 311, a rear side 312, an outer side 315, and a tearing edge 316. This beater paddle 310 is particularly suitable for materials that are readily compactable and not needing significant reduction in straw length.

The narrowed beater paddle 320, shown in FIG. 21, is formed of a pair of blades 324 which are attached, as by welding, to the surface of the drum 111 and are conjoined, as by a weld 323, so as to have an angular relationship of about 60°. Each blade 324 has a front side 321, a rear side 322, an outer side 325, and a tearing edge 326. This beater paddle 320 is particularly suitable for materials that are not easily compactable, such as edge portions of a rick, because of dryness, high straw content, high corn-cob content, etc., or for materials needing size reduction of the component straw according to the principles discussed for FIG. 12 for reducing straw length in correlation with the width across the tearing edges 326. This beater paddle 320 creates increases sidewise compressive forces and a greater compaction of clumps.

The flat beater paddle 330, shown in FIG. 22, is formed of a single blade which is attached, as by welding, to the surface of the drum 111 so as to have approximately a 180° relationship with reference to its center line. Any angular relationship that is substantially close to 180° is herein considered to be a flat paddle 330 because it creates no perceptible center compaction of retained clumps. The flat paddle 330 has a front side 331, a rear side 332, an outer side 335, and tearing edges 336. This flat paddle 330 is particularly suitable for stringly material needing no reduction in straw length, especially such materials as bulk corn fodder, or for very highly compactable material.

Angular variation of the blades of paddle-type scoops is as applicable for the scoops of FIG. 14 as for the scoops of FIG. 12. Moreover, the semi-circular scoops of FIG. 15 can be varied to any curved configuration of varied radius, such as hyperbolic or elliptical, which provide control of sidewise compressive forces.

FIGS. 23 and 24 illustrate the water-removal means provided by this invention for dewatering clumps by removal of water driven out of the clumps by initial compaction under impact and by subsequent compaction during very brief curvilinear acceleration thereafter. The driven-out water is believed to have a relatively long time for egress during revolution to the clump departure position, approximately 6 milliseconds being available therefor at 2,400 rpm.

Elongated holes 301 and circular holes 302 are preferred but are merely exemplary; any perforation of any shape or any perforated screen having sufficient rigidity and strength to withstand the bending and sheer forces involved is suitable. These holes or openings 301, 302 may be either randomly or patternly distributed. The elongated holes 301 are shown in random distribution, and the circular holes 302 are shown as distributed in a square pattern, but these may be reversed or replaced by any other arrangement. In particular, holes 301, 302 may be varied in size or shape or concentration in order to maximize water removal, especially in the central region of each paddle 310, 320 where the blades 314, 324 converge with the beater drum 111. In addition, holes may be provided in the surface of the beater drum 111, just forward of the front sides 311, 321 for removal of water, particularly in combination with a suction means within the beater drum 111.

At the front end of the straddle carrier vehicle 30 is a rick intake means 140 which comprises a pair of laterally spaced and outwardly diverging intake side sweepers 141, 142 and a pair of inwardly bulging wheel wells 143, 148. The left-side sweeper 141 and the right-side sweeper 142 are rigidly attached to the front edges 96 of the left tunnel wall 93 and right tunnel 95, respectively, and are each strengthened by the supporting brackets 147. The left wheel well 143 and the right wheel well 148 are rigidly attached to and effectively replace the left tunnel wall 93 and the right tunnel wall 95, respectively, having tapered edges 149 which aid in the intake of a settled rick 25a. Because the wheel wells 143, 148 bulge inwardly into the tunnel formed by the tunnel sides 93, 95, as clearly indicated in FIGS. 4 and 10, they provide a delayed compressive action to the incoming compost and prevent the compost from becoming wedged into the corners formed by the tunnel walls 93, 95, the concrete wharf 19, and the surface of the beater drum 111. In addition, the wheel wells 143, 148 augment the steering effect of the side sweepers 141, 142 However, the machine 15 is operable with the sweepers 141, 142 as the sole intake means, particularly if they are hydraulically actuated.

Figure 2:
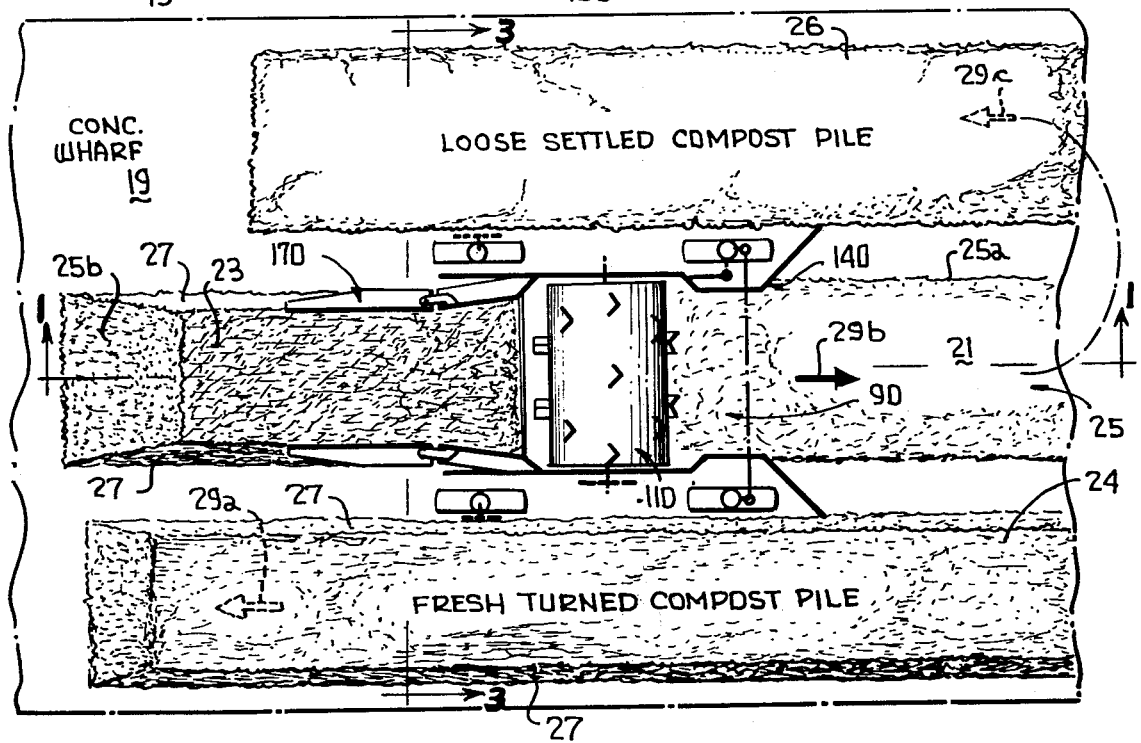
FIG. 2 is a diagrammatic plan view showing the vehicular composting machine while moving between rows of composts stacked on a concrete wharf and aerating the middle row.
Figure 4:
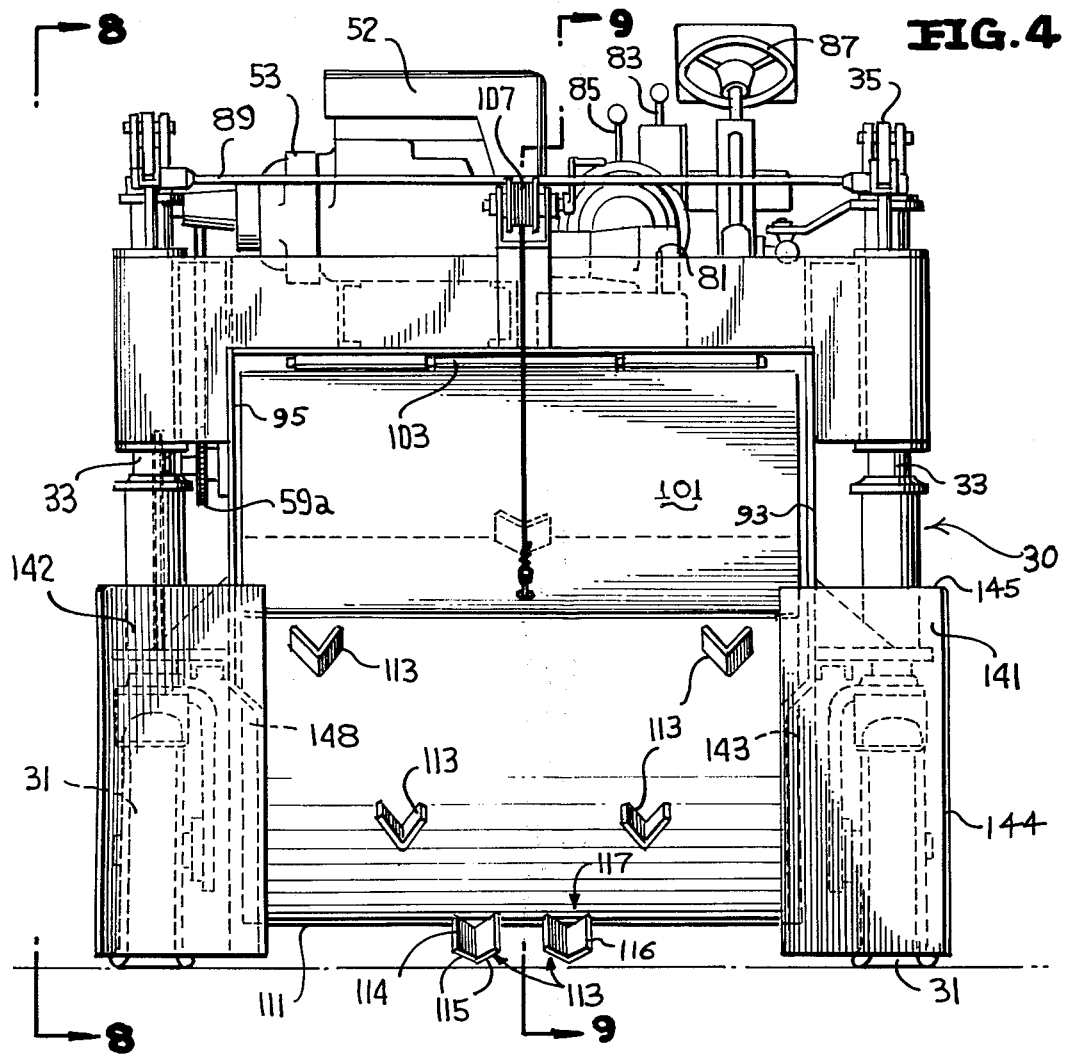
FIG. 4 is a front elevation of the machine.

The forward edges 144 of the side sweepers 141, 142 must be completely outward of a settled rick 25a, as indicated in FIG. 2, and must completely cover the wheels 31, as indicated in FIG. 4. The top edges 145 of the side sweepers 141, 142 must also be slightly above the top surface 21 of a settled rick 25a, as indicated in FIG. 1. In order to sweep up scattered side material, each sweeper 141, 142 may be provided with a moldboard plow, a rotatably upright roller, an upwardly moving conveyor, or like means for sweeping up this scattered material and moving it to the top of the compacted ricks.

The scavenger means 130 comprises a plow 131 and the barrier guide 137, although the vehicular composting machine 15 may be operated successfully without the barrier guide 137, particularly on sticky materials. The ends 134 of the plow 131 and the ends 138 of the barrier guide 137 are rigidly attached, as shown in FIG. 9, to the tunnel walls 93, 95 and to the packing compressors 171, 173, respectively, as set forth hereinafter. The plow and the guide 137 are supported by a plurality of braces 132.

The plow 131 has a shave edge 133 at its bottom and a top edge 135 with which the top of the barrier guide 137 is conjoined. The plow 131 is substantially arcuate and is annularly spaced from the beater drum 111, as shown clearly in FIG. 9, slightly beyond the periphery of travel 119 of the blade edges 115. The shave edge 133 thus acts in cooperation with the plow 131 as does the cutting edge of a turnplow, so that all material which protrudes upwardly beyond the bottom edges 98 of the tunnel walls 93, 95 is caught by the shave edge 133 and exposed to the revolving paddles 113 so that the plow 131 and the beater drum 111 thus cooperate in attacking and completely removing the endwise wall of waste material of a settled rick 25a as the machine 15 moves continuously and sequentially through it.

The hydrating means 150 comprises the front header 151, the rear header 153, a pair of longitudinal headers 155, a pair of intake lines 164, a pair of intake valves 163, and a pair of intake connections 165 to extensible hoses which are not shown in the drawings and which pass over the pair of hose guides 167. Each header 151, 153 is provided with a plurality of nozzles. These nozzles are the forwardly directed nozzles 157, the vertically directed nozzles 159, and the rearwardly directed nozzles 161. As shown in FIGS. 9 and 10, these nozzles are disposed along the length of each header 151, 153. The water sprayed therefrom, at a pressure of 60–200 psig as forward discharge sprays 156, downward discharge sprays 158, and rearward discharge sprays 162, vigorously wets the agitated waste material therebeneath.

The rick shaping means 170 comprises a pair of discharge side compressors and a discharge top baffler 191. The pair of discharge side compressors mutually converge upward and rearwardly. Each discharge side compressor comprises a packing compressor and a shaping compressor. The left packing compressor 171 is rigidly attached to the left tunnel wall 93 by means of a beveled connecting surface 175, and the right packing compressor 173 is similarly attached to the right tunnel wall 95 with a beveled connecting surface 175. Each packing compressor 171, 173 is rigidly attached to its respective tunnel wall 93, 95 along its bottom edge to the point that the bottom edge of the barrier guide 37 conjoins therewith, as shown in FIG. 10. The top edge of each packing compressor 171, 173 is rigidly attached along its entire length to the ceiling 91. The ends 134 of the plow 131 and the ends 138 of the barrier guide 137 are each rigidly attached, as by welding, to the packing compressors 171, 173 and tunnel walls 93, 95, as shown in FIG. 10.

Figure 3:
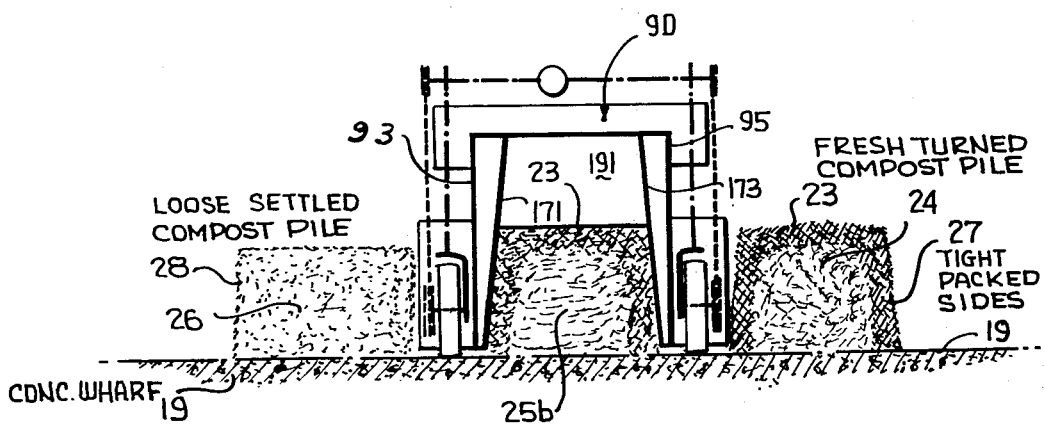
FIG. 3 is a diagrammatic rear view showing the three rows of FIG. 2, looking in the direction of the arrows 3—3 in FIG. 2.

The left shaping compressor 177 is hingeably attached by three hinges 181 to the rear edge 172 of the left packing compressor 171, and the right shaping compressor 179 in similarly attached by three hinges 181 and positioning arms and brackets 182 to the rear edge 174 of the right packing compressor 173. Each shaping compressor 177, 179 has a top edge 183, a rear edge 185, a bottom edge 187, and an inclined edge 189. The inclined edges 189 help to compress and shape the sides 27 of a freshly turned rick 25b, as indicated in FIGS. 2 and 3.

The discharge top baffler 191 has a hinge 193, by which it is attached to the vehicle 30, and a bottom edge 194. The discharge top baffler 191 is positionally adjusted by means of a suspending cable 195 which is stored on a reel 197 and controlled by a handle 199 so that its bottom edge 194 moves through a periphery of travel 196. As shown in FIG. 9, its bottom edge 194 is specifically adjusted so that it levels the top surface 23' of the outgoing aerated rick 25b, thereby creating a leveling wave 22b, to the desired height 23 prior to emergence of the rick 25b from sidewise packing between the shaping compressors 177, 179.

As indicated in FIGS. 13 and 17, a pair of hydraulically operated funnel compressors 200 may also be used as an auxiliary and selectively operable side packing means. Each funnel compressor 200 is hingeably attached to the inner surface of one of the packing compressors 171, 173 along a vertically disposed hinge and is hydraulically movable with respect thereto. By this means, and alongside the aerated rick as it is building within the tunnel means 90, the sides 27 of the aerated rick can be selectively compressed and the top 23 can be built to any reasonable height.

As shown diagrammatically in FIG. 16, the hydraulically operated shaping compressor 179 is hingeably attached to the right packing compressor 173 with a hydraulic slide mounting 184, whereby it can be slideably aligned with the trailing edge of its associated funnel compressor 200. The hydraulic cylinder 186, for operating the shaping compressor 179 and pressing it against the right side 27 of an aerated rick, is mounted with a resiliency-imparting means. With both shaping compressors 177, 179 resiliently and hydraulically operated and slideably alignable with a pair of funnel compressors 200, the vehicular composting machine 15 is able to shape a very wide range of nonflowable solid materials into ricks of selected height and width.

For aerobically decomposing solid wastes, such as municipal garbage, the multi-rick embodiment shown in FIGS. 17 and 18 is particularly useful because of its large size. The multi-rick machine comprises a plurality of discharge top bafflers 251a,b,c,d, which are hingeably attached to a ceiling 91, and a plurality of vertical separators 241, 242, 243, which are rigidly attached to the ceiling 91 and suitably braced. Each separator 241, 242, 243 has a relatively blunt leading edge 245 and a midsection of uniform thickness from top to bottom that tapers rearwardly very gradually toward a trailing edge 247. When this machine moves through a quadri-rick disposed on a flat surface 19, it forms two outer ricks 253a, 253d, having one tapered side 254, 255 respectively, and one or more inner ricks, such as the ricks 253b, 253c, having straight sides bordering on breathing slots 257 by means of which the quadri-rick maintains its aerobic condition, wherein air tends to enter a rick and exhaust through or near its top.

DESCRIPTION OF THE PREFERRED METHOD

Typically, a flat area is selected, preferably a hard-surfaced area such as a concrete wharf 19 shown in FIGS. 1-3. A plurality of truckloads of aerobically dicomposable material are deposited contiguously, along approximately straight lines, to form a plurality of parallel strips 24, 25, 26 having a length of about 300 feet. If not pre-blended, separate materials may be deposited alternatively or as superposed strips to be mixed by the machine 15. From each strip, samples are taken at intervals, blended, split, etc., and analyses are made for moisture content and nitrogen content. The average amounts of water and a nitrogenous material, such as ammonia, calcium cyanamide, cotton seed meal, chicken manure, urea, and ammonium nitrate, to be added are then calculated so that an initial nitrogen content of 1.5 percent, dry basis, is obtained.

The machine 15 is brought to the end of the first strip 24 of the strips 24, 25, 26, with its intake means 140 disposed to sweep all material into its tunnel means 90. With water intake valves 163 and nitrogen supply means adjusted, the machine 15 is moved through the first strip 24 from end-to-end while moving in direction 29a and is then turned 180° so that it can advance upon the next strip 25 while moving in direction 29b, finally moving in direction 29c through the rick 26. In similar fashion, the machine 15 moves through all of the piled material, converting linearly contiguous piles into shaped ricks 24, 25, 26 having a moisture content of 70 percent and a nitrogen content of 1.5 percent.

After about 3 days, when the temperature inside the ricks 24, 25, 26 has climbed to 140°–183°F. and the tops thereof, such as the top 21 of the settled rick 25a, have noticeably settled about 1 foot, the machine is moved through the compact ricks, foot-by-foot, to change each compact rick into an aerated rick, such as the compact portion 25a becoming the aerated portion 25b of the rick 25, as shown in FIGS. 1–3.

The discharged aerated ricks 24 and 25b have a top 23 that is usually 6 inches to 1 foot higher and a cross-section that is more nearly square than that of the settled compact rick 26, as is apparent in FIG. 3, with tightly packed sides 27, as compared to the loose sides 28 of the compact or settled rick 26. The higher top 23, however, generally settles in 1 day to the height of the compacted top 21.

In operating the machine of this invention on municipal, restaurant, and hospital wastes, it is practicable to combine sewerage treatment facilities with the composting operation by using sewerage effluent as the feed water to the hydrating means 150 and by adding sewerage sludge, as nitrogenous-bearing material, to the initial waste material. Because the temperature within the ricks 24, 25, 26 rises as high as 180°F or even higher, any harmful organisms that are added are largely killed. By this combination, aqueous pollution loads from phosphate-bearing sewerage effluents are obviated, and the phosphates are used directly for soil enrichment.

The method of this invention may be more clearly understood by reference to the following examples in which a vehicular composting machine constructed according to FIGS. 4–11 was used.

EXAMPLE 1

Using front-end loaders, a strip 300 feet long of mixed timothy hay and orchard grass was laid on a concrete wharf and approximately an equal amount by weight, dry basis, of crushed corn cobs was added thereto. Sufficient dry chicken manure was added at intervals by the foreman according to his experience and judgment to obtain 1.5 percent nitrogen by weight, dry basis.

The vehicular composting machine 15 moved through this pile slowly while adding water freely, the foreman adjusting the valves 163 as he walked alongside and periodically felt the wet, shaped rick with his hand. The rick was shaped flat on top, and nearly 8 feet high. The next day, although the outside temperature was not far above freezing, the temperature at 18 inch depths within the rick had reached about 135°F. The temperature then dropped the next day and rose again on the third day when steam could be seen seeping from the sides of the rick about 1 to 2 feet below its top. Three days of such aerobic activity caused the aerated rick to become a compacted rick about 7 feet high.

The machine 15 then moved again through the compacted rick while adding more water with its hydrating means 150. Steam blew out copiously between the sides of the baffler 191 and the shaping compressors 177, 179. The newly aerated rick had a height of 7½ feet.

This operation was repeated once more to produce a mushroom compost after the succeeding and final loading operation.

EXAMPLE II

A 90 foot strip of municipal garbage from Wilmington, Del., had been machine picked and then quickly hand picked, allowed to decompose for 3–4 months while being turned about 3 times, mixed with a small proportion of fresh, shredded waste paper, and formed into a strip with another machine. This strip was straddled by the machine 15. Without adding water, the rick was reformed into a low rick, about 8 feet wide at its bottom and 4½ feet high, by the machine 15 at about 5 feet per minute. The material was slightly warm to the touch, although the weather was cold.

Visual inspection of the finished aerated rick showed a truck innertube, a bicycle innertube, short sticks, small stones, many aluminum cans, a great deal of rigid and sheet plastic, much undecomposed paper, and a large amount of gray, earthy-appearing compost. Inspection of the tunnel means 90 revealed that the top edge 135 of the scavenger means 130 was festooned with a solid mass of draped polyethylene.

EXAMPLE III

A 200 foot long pile of mushroom compost tail ends which had been turned about 6 times and thoroughly decomposed so that it was mucky, black, and showing no sign of hay or straw, was straddled by the machine 15. The aerated rick had 65–70 percent moisture and after shaping had slick sides. However, decomposition was substantially completed, and no appreciable amount of steam was produced. No water was added while mixing the rick.

Inspection of the discharge section of the machine, after it had completely moved through the rick, showed that the polyethylene plastic remained on the top edge 135 and was partly covered with black, sticky compost.

EXAMPLE IV

Truck loads of fresh stockyard cow manure were laid on a concrete surface in a strip about 60 feet long. The machine 15 straddled the strip shortly after completing the previous experiment and moved through it without adding water, because the cow manure was sufficiently moist, at 4.5 feet per minute, producing a low demonstration rick that was 5 feet high.

The temperature of the manure was 90°F. as probed with a steel-encased dial thermometer to a depth of about 18 inches. A slight quantity of steam arose. Midway through the rick, the machine 15 stopped and backed up with the beater drum 111 still rotating. It was able to move backwards about 1 foot, the distance typically available in a hay-corn cob rick.

Thereafter, the machine, after resuming its mixing operation, ran without an operator on board for about 30 feet and reached the end of the rick. It was noticeable that the sticky cow manure would not form a smooth top when levelled by the bottom edge 194 but agglomerated into rough chunks about 8–12 inches across having deep clefts therebetween, a condition conducive to effective breathing of the rick during its aerobical decomposition.

The top edge 135 of the scavenger means 130 retained the polyethylene plastic, and a quantity of cow manure had displaced the compost and was wedged thereabove and touching the periphery of the beater drum 111.

It will be readily apparent to those skilled in the art that various modifications and alterations may be made in the aeration method described hereinbefore and in the form, construction, and arrangement of the various parts of the vehicular composting machine without departing from the basic principles and purpose of the invention. Such modifications and alterations are consequently intended to be included within the spirit and scope of the invention unless necessarily excluded therefrom by the appended claims when broadly construed.

What is claimed is:

1. In a vehicular composting machine, a scoop means, for liftingly detaching clumps from an upstanding endwise wall of a compacted rick, having a compaction control means which comprises a pressure means and a dewatering means for selectively densifying and dewatering said detached clumps during impact and curvilinear acceleration thereof.

2. The improved scoop means of claim 1 wherein said pressure means comprises a selected angle between the blades of a paddle-type scoop.

3. The improved scoop means of claim 2 wherein said selected angle is about 60°.

4. The improved scoop means of claim 2 wherein said selected angle is substantially greater than 90° and substantially less than 180°, whereby a sidewise compressive force of a selected magnitude is created by said impact and said acceleration.

5. The improved scoop of claim 4 wherein said selected angle is 118°–126°.

6. The improved scoop means of claim 2 wherein said selected angle is approximately 180°.

7. The improved scoop means of claim 1 wherein said pressure means comprises a selected curved configuration of varied radius.

8. The improved scoop means of claim 7 wherein said configuration is elliptical.

9. The improved scoop means of claim 1 wherein said dewatering means comprises perforations in said scoop means.

10. The improved scoop means of claim 9 wherein said perforations are circular.

11. The improved scoop means of claim 9 wherein said perforations are elliptical.

12. The improved scoop means of claim 9 wherein said perforations are randomly distributed.

13. The improved scoop means of claim 9 wherein said perforations are patternly distributed.

* * * * *